(12) United States Patent
Kang

(10) Patent No.: US 9,199,654 B2
(45) Date of Patent: Dec. 1, 2015

(54) ABSOLUTE POSITION DETECTION SYSTEM

(75) Inventor: Dong Hoon Kang, Gyeonggi-do (KR)

(73) Assignee: KOREA RAILROAD RESEARCH INSTITUTE, Gyeonggi-do (KR)

( * ) Notice: Subject to any disclaimer, the term of this patent is extended or adjusted under 35 U.S.C. 154(b) by 0 days.

(21) Appl. No.: 14/371,672

(22) PCT Filed: May 31, 2012

(86) PCT No.: PCT/KR2012/004301
§ 371 (c)(1),
(2), (4) Date: Jul. 10, 2014

(87) PCT Pub. No.: WO2013/125753
PCT Pub. Date: Aug. 29, 2013

(65) Prior Publication Data
US 2014/0368837 A1    Dec. 18, 2014

(30) Foreign Application Priority Data
Feb. 20, 2012    (KR) .................... 10-2012-0017168

(51) Int. Cl.
*G01B 11/14*    (2006.01)
*B61L 25/02*    (2006.01)

(52) U.S. Cl.
CPC .............. *B61L 25/025* (2013.01); *G01B 11/14* (2013.01)

(58) Field of Classification Search
USPC ................................................ 356/614–624
See application file for complete search history.

(56) References Cited

U.S. PATENT DOCUMENTS 4,788,441 A * 11/1988 Laskowski ............... 250/559.38
2006/0098843 A1    5/2006 Chew

FOREIGN PATENT DOCUMENTS

| JP | 05-042873 | 2/1993 |
| JP | 10-049231 | 2/1998 |
| JP | 2008-502538 | 1/2008 |
| WO | WO 2004-026660 | 4/2004 |

OTHER PUBLICATIONS

International Search Report mailed Dec. 6, 2012 for PCT/KR2012/004301.

* cited by examiner

*Primary Examiner* — Tri T Ton

(57) ABSTRACT

The present invention relates to an absolute position detection system. More particularly the present invention relates to a system for detecting an absolute position on a vehicle travel path. For example, disclosed is an absolute position detection system comprising: a plurality of pattern units arranged at a predetermined spacing on a vehicle travel path and having one or more first patterns and one or more second patterns having light reflectances that differ from each other; a pattern scan unit installed in a vehicle to scan each of the plurality of pattern units by laser beam and measuring light reflectance for each of the first and second patterns; a data processing unit for comparing the measured light reflectance and a preset reflectance light reflectance, and performing binary data processing on the result of the comparison to recognize each of the plurality of pattern units; and a position detection unit for detecting the absolute positions of the plurality of pattern units by means of the processed binary data and information on the distance between the plurality of pattern units.

22 Claims, 4 Drawing Sheets

ABSOLUTE POSITION DETECTION SYSTEM

This application claims the priority of Korean Patent Application No. 10-2012-017168, filed on Feb. 20, 2012 in the KIPO (Korean Intellectual Property Office), the disclosure of which is incorporated herein entirely by reference. Further, this application is the National Stage application of International Application No. PCT/KR2012/004301, filed May 31, 2012, which designates the United States and was published in Korean. Each of these applications is hereby incorporated by reference in their entirety into the present application.

TECHNICAL FIELD

Aspects of the present invention relate to an absolute position detecting system. More particularly, aspects of the present invention relate to a system for detecting an absolute position on a traveling path of a vehicle.

BACKGROUND ART

In order to stably operate a railroad vehicle, it is necessary to grasp information on accurate positions of all of railroad vehicles traveling on the entire tracks. In general, among methods for detecting positions of railroad vehicles traveling on tracks, a track circuit method is well known.

However, the conventional method renders several disadvantageous in that only the positions of vehicles ranging from several hundred meters to several kilometers can be discriminated due to characteristics of a track circuit, and the effectiveness is poor because of a risk of occurrence of electronic waves or malfunctioning of a track circuit due to the use of an electrical contact method for position detection, installation and maintenance of the track circuit are not easily achieved, and installation and maintenance costs are considerably high.

DISCLOSURE OF THE INVENTION

Technical Problem

Aspects of the present invention provide an absolute position detecting system, which can implement a stable operation in a non-contact manner by facilitating installation and maintenance, reducing installation and maintenance costs.

Technical Solution

In accordance with one aspect of the present invention, there is provided an absolute position detecting system including multiple pattern parts arranged on a traveling path of a vehicle at a predetermined distance and including at least one or more of first and second patterns, a pattern scanning part installed in the vehicle and scanning each of the multiple pattern parts using laser beams and measuring light reflectivity for each of the first and second patterns, a data processing part comparing the measured light reflectivity with a predetermined reference light reflectivity, processing the comparison result into binary data and recognizing the multiple pattern parts, and a position detecting part detecting absolute positions of the multiple pattern parts using the processed binary data and information on a distance between the multiple pattern parts.

The first and second patterns may have different surface roughness levels.

The patterns provided in each of the multiple pattern parts may be arranged in a line within a given area.

In addition, the patterns provided in each of the multiple pattern parts may be spaced apart from each other.

A total number of the patterns provided in each of the multiple pattern parts may be constant.

The multiple pattern parts may be installed to be parallel with the ground surface.

In addition, the multiple pattern parts may be installed obliquely with respect to the ground surface.

The multiple pattern parts may be installed perpendicularly to the ground surface and multiple reflectors may further be provided to reflect the laser beams irradiated from the pattern scanning parts to the multiple pattern parts.

The data processing may be performed on the basis of each one of the pattern parts of the data processing part, and the binary data may represent the order of each of the multiple pattern parts sequentially arranged from a first position to a second position of the traveling path.

In accordance with another aspect of the present invention, there is provided an absolute position detecting system including multiple pattern parts arranged on a traveling path of a vehicle at a predetermined distance and including at least one or more of first and second patterns, a pattern scanning part installed in the vehicle and scanning each of the multiple pattern parts using laser beams and measuring a light reflection time for each of the first and second patterns, a data processing part comparing the measured light reflection time with a predetermined reference light reflection time, processing the comparison result into binary data and recognizing the multiple pattern parts, and a position detecting part detecting absolute positions of the multiple pattern parts using the processed binary data and information on a distance between the multiple pattern parts.

The patterns provided in each of the multiple pattern parts may be arranged in a line within a given area.

In addition, the patterns provided in each of the multiple pattern parts may be spaced apart from each other.

A total number of the patterns provided in each of the multiple pattern parts may be constant.

The multiple pattern parts may be installed to be parallel with the ground surface.

In addition, the multiple pattern parts may be installed obliquely with respect to the ground surface.

Further, the multiple pattern parts may be installed perpendicularly to the ground surface and multiple reflectors may further be provided to reflect the laser beams irradiated from the pattern scanning parts to the multiple pattern parts.

The binary data may represent the order of the multiple pattern parts sequentially arranged from a first position to a second position of the traveling path.

In accordance with still another aspect of the present invention, there is provided an absolute position detecting system including multiple pattern parts arranged on a traveling path of a vehicle at a predetermined distance and including at least one or more of first and second patterns, a pattern photographing part installed in the vehicle, photographing each of the multiple pattern parts and measuring a brightness value for each of the first and second patterns, a data processing part comparing the measured brightness value with a predetermined reference brightness value, processing the comparison result into binary data and recognizing the multiple pattern parts, and a position detecting part detecting absolute positions of the multiple pattern parts using the processed binary data and information on a distance between the multiple pattern parts.

The patterns provided in each of the multiple pattern parts may be arranged in a line within a given area.

In addition, the patterns provided in each of the multiple pattern parts may be spaced apart from each other.

A total number of the patterns provided in each of the multiple pattern parts may be constant.

The binary data may represent the order of the multiple pattern parts sequentially arranged from a first position to a second position of the traveling path.

Advantageous Effects

As described above, in the absolute position detecting system according to the present invention, a stable operation can be implemented in a non-contact manner by facilitating installation and maintenance, reducing installation and maintenance costs.

MODE FOR CARRYING OUT THE INVENTION

Hereinafter, examples of embodiments of the invention will be described in detail with reference to the accompanying drawings such that they can easily be made and used by those skilled in the art.

Hereinafter, an absolute position detecting system 100 according to a first embodiment of the present invention will first be described.

Figure 1:
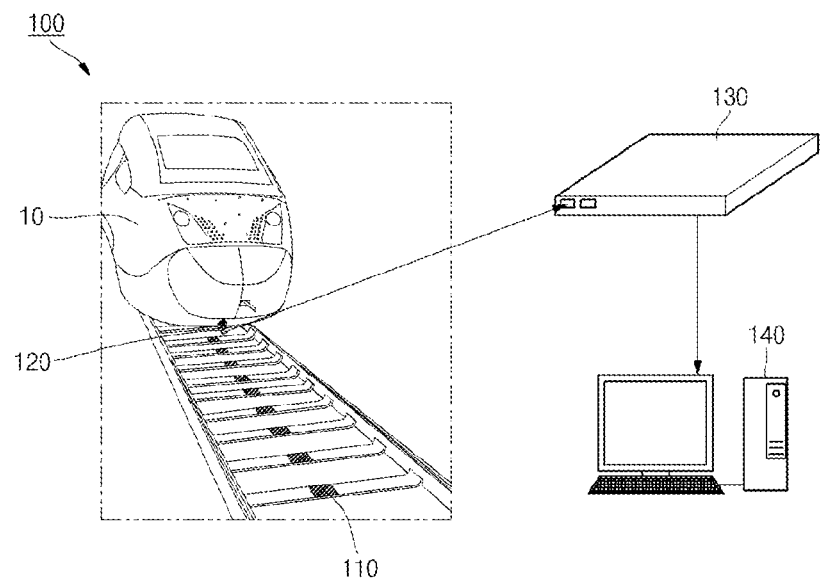
FIG. 1 is a schematic diagram illustrating a structure of an absolute position detecting system according to a first embodiment of the present invention.
Figure 2:
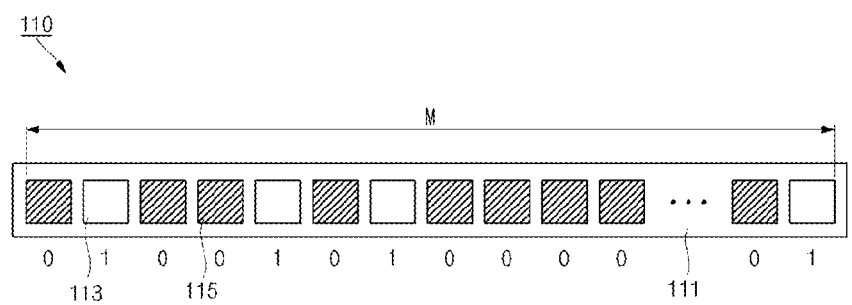
FIG. 2 illustrates a structure of a pattern part of the absolute position detecting system according to the first embodiment of the present invention.

FIG. 1 is a schematic diagram illustrating a structure of an absolute position detecting system 100 according to a first embodiment of the present invention, and FIG. 2 illustrates a structure of a pattern part 110 of the absolute position detecting system according to the first embodiment of the present invention.

Referring to FIGS. 1 and 2, the absolute position detecting system 100 according to the first embodiment of the present invention includes multiple pattern parts 110, a pattern scanning part 120, a data processing part 130 and a position detecting part 140.

The multiple pattern parts 110 may be arranged on a traveling path of a vehicle 10 at a predetermined distance. For example, the pattern parts 110 may be applied to a railroad. In this case, the pattern parts 110 may be arranged at each railroad tie based on wood, concrete or a compound and may be installed on the railroad tie to be parallel with the ground surface. The vehicle 10 may be a fast train, but not limited thereto. That is to say, the vehicle 10 may be an ordinary railway vehicle and other transportation means. The vehicle 10 of the present embodiment will be described with regard to a fast train traveling at a speed of approximately 300 km/h.

As shown in FIG. 2, each of the pattern parts 110 may include a base 111, a first pattern 113 and a second pattern 115. In addition, the pattern part 110 may include at least one of the first and second patterns 113 and 115 or a combination of the first and second patterns 113 and 115. The respective first and second patterns 113 and 115 may be shaped of substantially rectangular plates and may be arranged in a line within a given area by the base 111. For example, the first and second patterns 113 and 115 may be arranged in a line on the base 111 to be spaced apart from each other. Here, the first and second patterns 113 and 115 are not necessarily arranged in a line and may be arranged in parallel in units of a predetermined number of patterns.

The first pattern 113 and the second pattern 115 are preferably made of materials each having light reflectivity, for example, a metal such as iron (Fe). In addition, the first pattern 113 and the second pattern 115 may have different light reflectivity values. For example, the light reflectivity of the first pattern 113 may be higher than that of the second pattern 115. As described above, in order to make the first pattern 113 and the second pattern 115 have different light reflectivity values, the first pattern 113 and the second pattern 115 may be configured to have different surface roughness levels. For example, the second pattern 115 may be configured to have a surface of higher roughness than the first pattern 113, thereby making the surface of the first pattern 113 demonstrate higher light reflectivity than the surface of the second pattern 115.

A total number M of the first and second patterns 113 and 115 provided in each pattern part 110 is constant and may be determined by the following equations:

$$(1/d)*v=N \quad (1)$$

$$N=2M \quad (2)$$

where d is a distance between railroad ties, v is a traveling speed of the vehicle 10, and N is a total number of the pattern parts 110. The present invention will be described with regard to a train traveling at a speed of 300 km/h, operated by the KORAIL. Here, a full length of the KORAIL is approximately 3300 km. In general, a distance between railroad ties for an ordinary train is 0.6 m and a distance between railroad ties for a fast train is 0.65 m. The present invention will be described with regard to a case of the ordinary train by way of example. Therefore, in the ordinary train, the total number N of the pattern parts 110 and the total number M of the first and second patterns 113 and 115 per pattern part 110 will be calculated in the following manner:

$$N=(1/0.6\ m)*300\ km/h \approx 5.8 \times 106\ \text{pieces} \quad (1')$$

$$5.8 \times 106\ \text{pieces} \approx 223 \quad (2')$$

According to the equation (1'), the total number N of the pattern parts 110 is approximately (5.8×106) pieces, and the total number M of the first and second patterns 113 and 115 per pattern part 110 is 23. The thus-obtained N and M are provided only for illustration, but aspects of the present invention are not limited thereto.

The pattern scanning part 120 is installed in the vehicle 10 and may scan each of the multiple pattern parts 110 using laser beams. In addition, since the first and second patterns 113 and 115 are arranged on the base 111 to be spaced apart from each other, patterns can be discriminated from each other, thereby allowing the pattern scanning part 120 to measure light reflectivity of each of the first and second patterns 113 and 115. In addition, as illustrated above, since the first and second patterns 113 and 115 have different surface roughness levels, they may demonstrate different light reflectivity values with respect to the laser beams. In addition, since the first and second patterns 113 and 115 are arranged in a predetermined order, the pattern scanning part 120 may transmit the measured M light reflectivity values according to the arrangement order of M patterns to the data processing part 130. The pattern scanning part 120 may be configured by mounting a separate sensor capable of measuring the light reflectivity using laser beams.

Meanwhile, when consideration is taken into a traveling speed of the vehicle 10 (300 km/h), the pattern scanning part 120 may have an appropriate scan speed of a 1 kHz scale. In addition, since the pattern scanning part 120 needs to scan the pattern part 110 having a predetermined length, a beam having a line-shaped area spot is preferably irradiated, and a beam size may be determined according to the length of the pattern part 110. Further, the resolution of the pattern scanning part 120 may be determined according to the distance between patterns.

The data processing part 130 may receive data from the pattern scanning part 120 and may perform binary data processing based on the received data, thereby recognizing the multiple pattern parts 110, respectively. In more detail, the data processing part 130 compares the measured light reflectivity of one of the pattern parts 110 with a predetermined reference light reflectivity, and processes the comparison result into binary data. For example, the data processing part 130 compares each of the measured light reflectivity values with the reference light reflectivity, and binary processing is performed such that if the measured light reflectivity is smaller than the reference light reflectivity, the comparison result is converted into a logic sign '0', and if the measured light reflectivity is larger than the reference light reflectivity, the comparison result is converted into a logic sign '1'. In an example, assuming that the received data is represented by a set Pr={6, 9, 6, 6, 9, 6, 9, 6, . . . , 6, 9} having the light reflectivity values measured for one pattern part 110 as elements (M=23) and the reference light reflectivity value is '7', the binary data processed by the data processing part 130 may become '01001010000000000000001'. The binary data processed by the data processing part 130 may be transmitted to the position detecting part 140.

The binary data may represent orders of the multiple pattern parts 110. As illustrated above, assuming that 23 patterns are provided in one pattern part 110, the processed binary data is recognized as 23-digit binary numbers in the pattern part 110. In the pattern part 110 shown in FIG. 2, for example, the binary data processed by the data processing part 130 may be represented by the 23-digit binary numbers '01001010000000000000001', which may be converted into a decimal number representing the order of a 2424833th pattern part. That is to say, the pattern part 110 shown in FIG. 2 means a '2424833th one among the pattern parts ranging from a $0^{th}$ pattern part (positioned at the starting point of railroad) to a (5.8×106)th pattern part (positioned at the ending point of railroad).

As described above, the multiple pattern parts 110 are arranged sequentially from the starting point to the ending point of the traveling path of the vehicle 10 and have their own orders, respectively. Here, the orders are represented by the first and second patterns 113 and 115 provided in each of the pattern parts 110. For example, when the pattern part positioned at the starting point is referred to as a $0^{th}$ pattern part, the next pattern part is referred to as a 1st pattern part, the following pattern parts are referred to as 2nd, 3rd, 4th pattern parts, respectively, and the last pattern part positioned at the ending point of the traveling path of the vehicle 10 is referred to as a (5.8×106)th pattern part, the structures of the first and second patterns 114 and 115 provided in each of the pattern parts 110 are shown in Table 1 below.

TABLE 1

| railway line | Order of pattern unit | Structure of first and second patterns by order |
| --- | --- | --- |
| Starting point ↓ | 0 | '00000000000000000000000' |
| | 1 | '00000000000000000000001' |
| | 2 | '00000000000000000000010' |
| | 3 | '00000000000000000000011' |
| | 4 | '00000000000000000000100' |
| | 5 | '00000000000000000000101' |
| | 6 | '00000000000000000000110' |
| | 7 | '00000000000000000000111' |
| | . | . |
| | . | . |
| Ending point | $5.8 \times 10^6$ | '10110001000000001000000' |

As shown in FIG. 2, the first pattern 113 may be represented as a logical sign '1' and the second pattern 115 may be represented as a logical sign '0'. Therefore, as shown in Table 1, as the order of the pattern part becomes higher, the first and second patterns 113 and 115 provided in each pattern part may be arranged to be up-counted.

The position detecting part 140 may detect an absolute position of a desired pattern part based on the binary data processed by the data processing part 130 and information on distances between each of the pattern parts 110. That is to say, the position detecting part 140 performs a multiplying operation of the order of the pertinent pattern part and the distance between the pattern parts, thereby detecting the position of the pertinent pattern part. For example, when the desired pattern part intended to detect its position is a 2424833th pattern part and the distance between the pattern parts is 0.6 m, it is understood that the 2424833th pattern part is spaced approximately 1454.8998 km apart from the starting point of the railway line. In this way, the position detecting part 140 may grasp in real time position information of the desired pattern part intended to detect its position among the multiple pattern parts 110.

Figure 3:
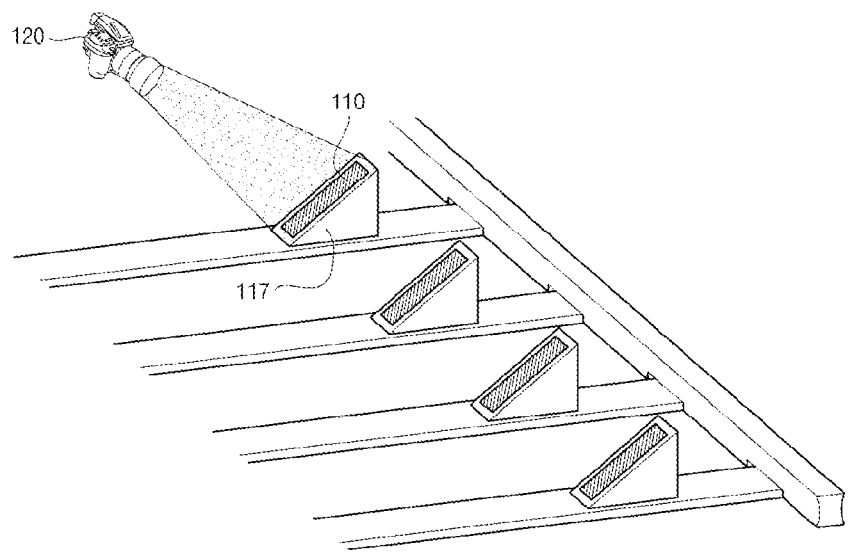
FIG. 3 illustrates another structure of a pattern part of the absolute position detecting system shown in FIG. 2 and a scanning operation of a pattern scanning part.

FIG. 3 illustrates another structure of a pattern part 110 of the absolute position detecting system shown in FIG. 2 and a scanning operation of a pattern scanning part 120.

As shown in FIG. 3, the pattern part 110 is positioned at a side part of a railroad tie, specifically on an inclination member 117 having an inclined surface inclined a predetermined angle with respect to a ground surface. In this case, the pattern scanning part 120 may be configured to irradiate laser obliquely toward the inclination member 117.

Figure 4:
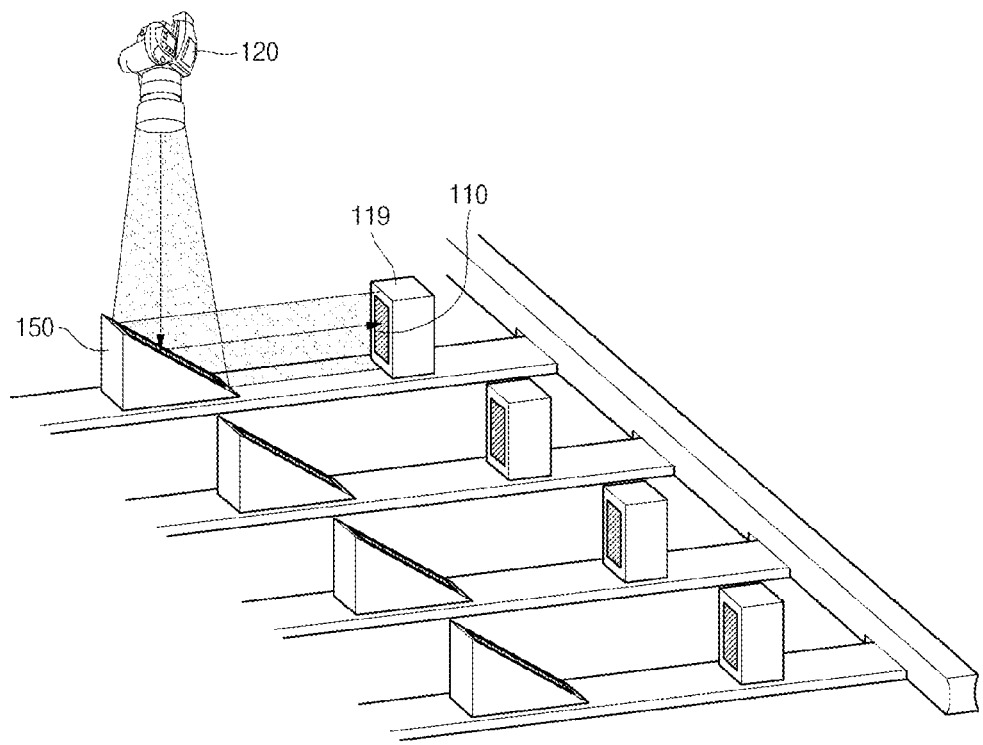
FIG. 4 illustrates still another structure of a pattern part of the absolute position detecting system shown in FIG. 2 and a scanning operation of a pattern scanning part.

FIG. 4 illustrates still another structure of a pattern part 110 of the absolute position detecting system shown in FIG. 2 and a scanning operation of a pattern scanning part 120.

As shown in FIG. 4, the pattern part 110 is positioned at a side part of a railroad tie and installed on a side surface of a support member 119 to be perpendicular to the ground surface. In this case, the pattern scanning part 120 may scan the pattern part 110 installed on the side surface of the support member 119 using a separate reflector 150. Here, the reflector 150 may have a reflection surface inclined to reflect the laser irradiated from the pattern scanning part 120 to the pattern part 110.

Hereinafter, an absolute position detecting system 500 according to a second embodiment of the present invention will be described.

Figure 5:
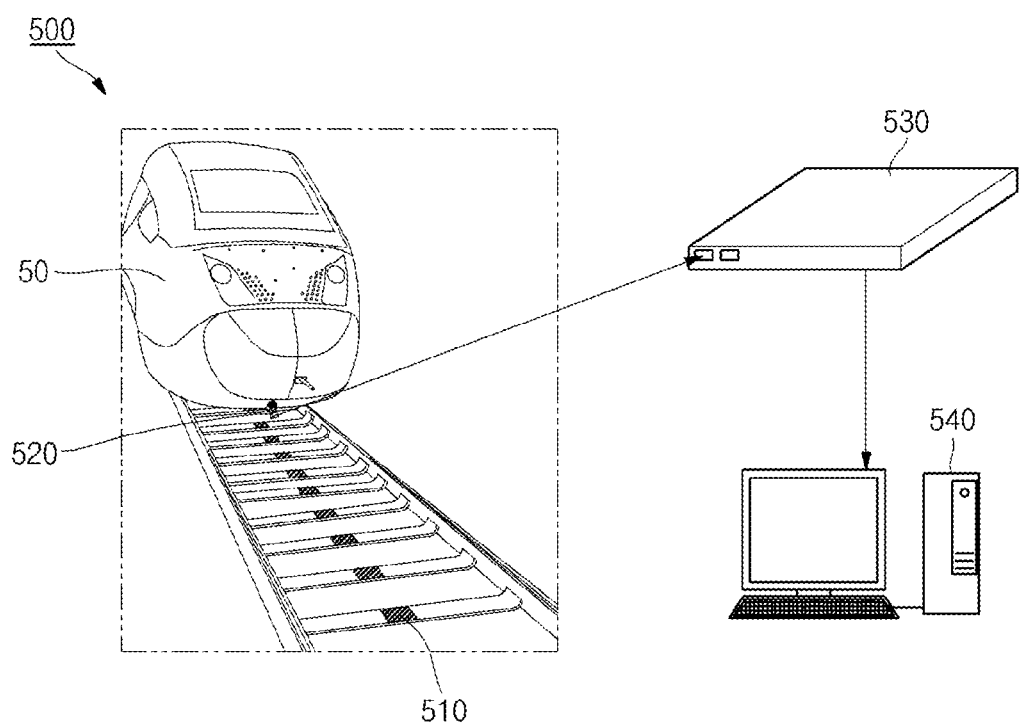
FIG. 5 is a schematic diagram illustrating a structure of an absolute position detecting system according to a second embodiment of the present invention.
Figure 6:
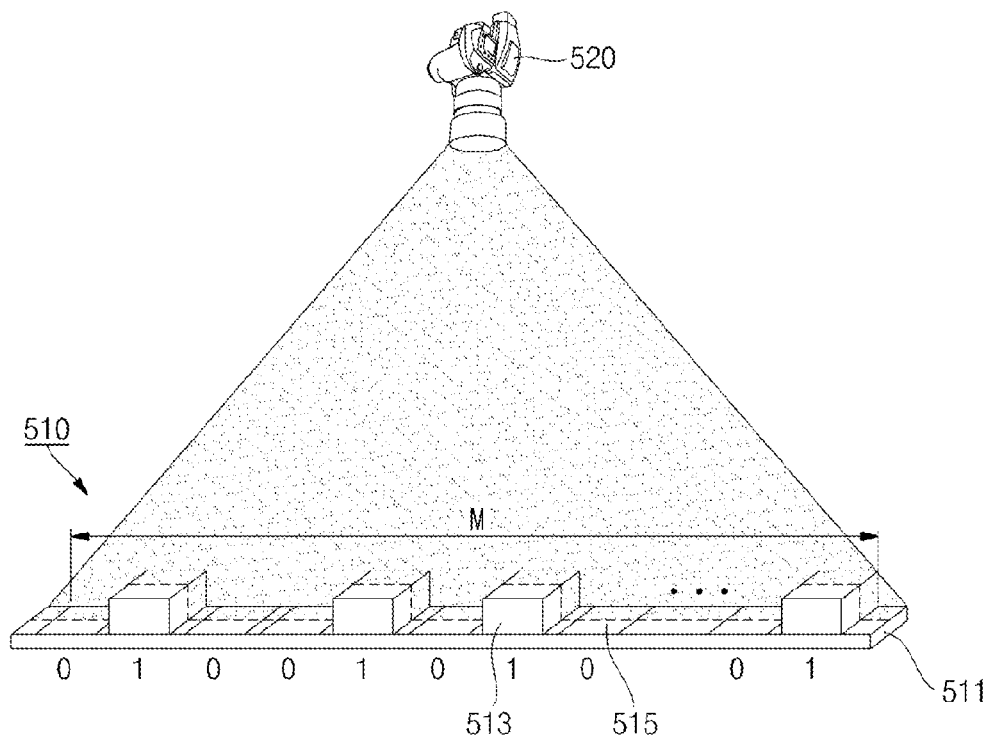
FIG. 6 illustrates a structure of a pattern part of the absolute position detecting system according to the second embodiment of the present invention.

FIG. 5 is a schematic diagram illustrating a structure of an absolute position detecting system 500 according to a second embodiment of the present invention and FIG. 6 illustrates a structure of a pattern part of the absolute position detecting system according to the second embodiment of the present invention.

Referring to FIGS. 5 and 6, the absolute position detecting system 500 according to a second embodiment of the present invention includes multiple pattern parts 510, a pattern scanning part 520, a data processing part 530 and a position detecting part 540.

The multiple pattern parts 510 may be arranged on a traveling path of a vehicle 50 at a predetermined distance and at least one or more of first and second patterns 513 and 515 having different heights may be provided and arranged. The first and second patterns 513 and 515 may be arranged on a base 511 in a line.

The pattern scanning part 520 is installed in the vehicle 50 and may scan each of the multiple pattern parts 510 using laser beams. In addition, the pattern scanning part 520 may measure light reflectivity of each of the first and second patterns 513 and 515. The pattern scanning part 520 may be configured to have a separate sensor capable of measuring a light reflection time for each of the first and second patterns 513 and 515 using laser beams.

The data processing part 530 compares the light reflectivity measured through the pattern scanning part 520 with a predetermined reference light reflectivity, and processes the comparison result into binary data to recognize the multiple pattern parts 510, respectively.

The position detecting part 540 may detect absolute positions of the multiple pattern parts 510 using the binary data processed by the data processing part 530 and information on a distance between the multiple pattern parts 510.

The absolute position detecting system 500 according to the second embodiment of the present invention is different from the absolute position detecting system 100 according to the first embodiment of the present invention in view of the followings.

In the second embodiment of the present invention, the first and second patterns 513 and 515 of the pattern part 510 have different heights, unlike the pattern part 110 in the first embodiment, so that a time taken for a laser beam to be irradiated and then reflected back to one of the first and second patterns 513 and 515 may be different from that taken for a laser beam to be irradiated and then reflected back to the other of the first and second patterns 513 and 515. For example, a light reflection time of a pattern having a greater height is shorter than that of a pattern having a smaller height.

Therefore, in the second embodiment, the respective patterns may be recognized using the light reflection time, instead of the light reflectivity of a pattern with respect to a laser beam. Configurations and operating principles of the data processing part 530 and the position detecting part 540 are similar to those of the data processing part 130 and the position detecting part 140 in the first embodiment, and detailed descriptions thereof will not be repeated.

Figure 7:
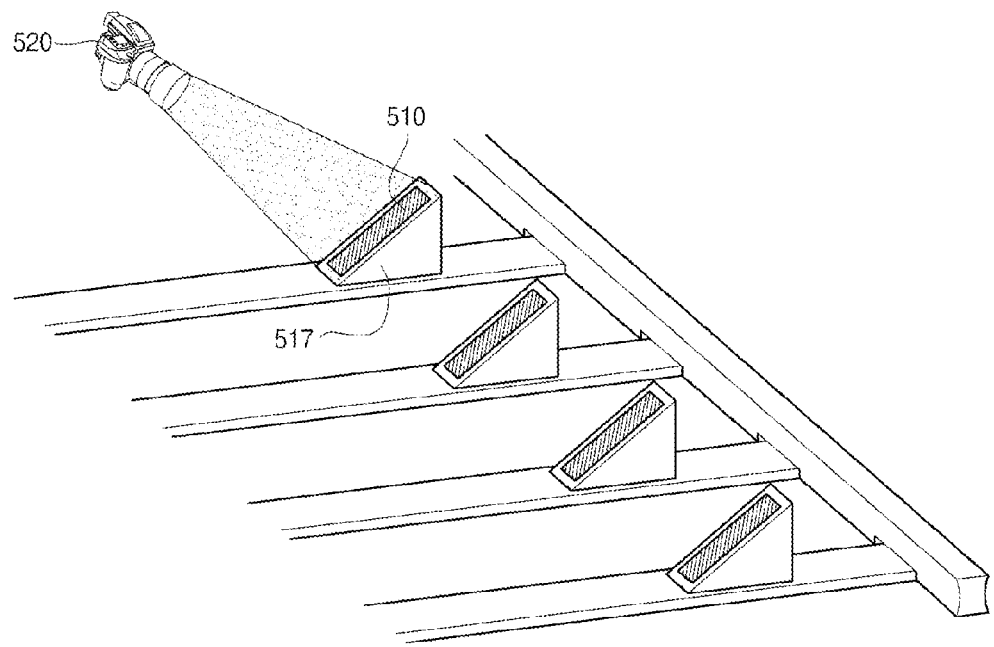
FIG. 7 illustrates another structure of a pattern part of the absolute position detecting system shown in FIG. 6 and a scanning operation of a pattern scanning part.

FIG. 7 illustrates another structure of a pattern part 510 of the absolute position detecting system shown in FIG. 6 and a scanning operation of a pattern scanning part 520.

As shown in FIG. 7, the pattern part 510 is positioned at a side part of a railroad tie, specifically on an inclination member 517 having an inclined surface inclined a predetermined angle with respect to a ground surface. In this case, the pattern scanning part 520 may be configured to irradiate laser obliquely toward the inclination member 517.

Figure 8:
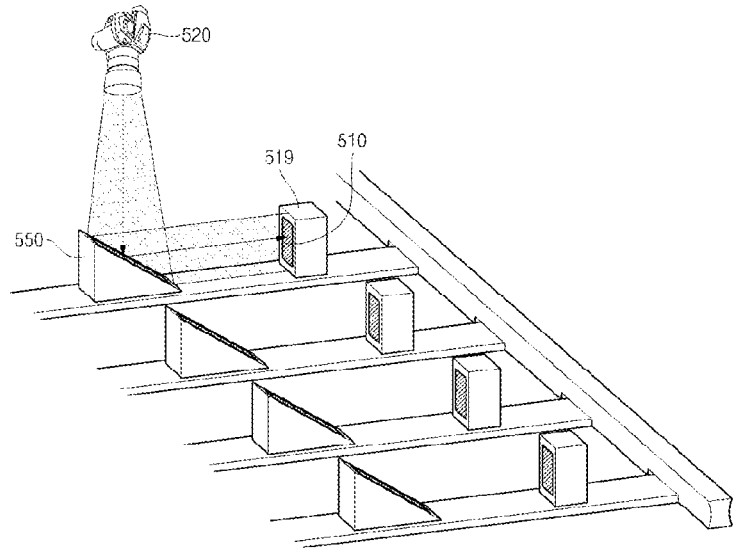
FIG. 8 illustrates still another structure of a pattern part of the absolute position detecting system shown in FIG. 6 and a scanning operation of a pattern scanning part.

FIG. 8 illustrates still another structure of a pattern part 510 of the absolute position detecting system shown in FIG. 6 and a scanning operation of a pattern scanning part 520.

As shown in FIG. 8, the pattern part 510 is positioned at a side part of a railroad tie and installed on a side surface of a support member 319 to be perpendicular to the ground surface. In this case, the pattern scanning part 520 may scan the pattern part 510 installed on the side surface of the support member 519 using a separate reflector 550. Here, the reflector 550 may have a reflection surface inclined to reflect the laser irradiated from the pattern scanning part 520 to the pattern part 510.

Hereinafter, an absolute position detecting system 900 according to a second embodiment of the present invention will be described.

Figure 9:
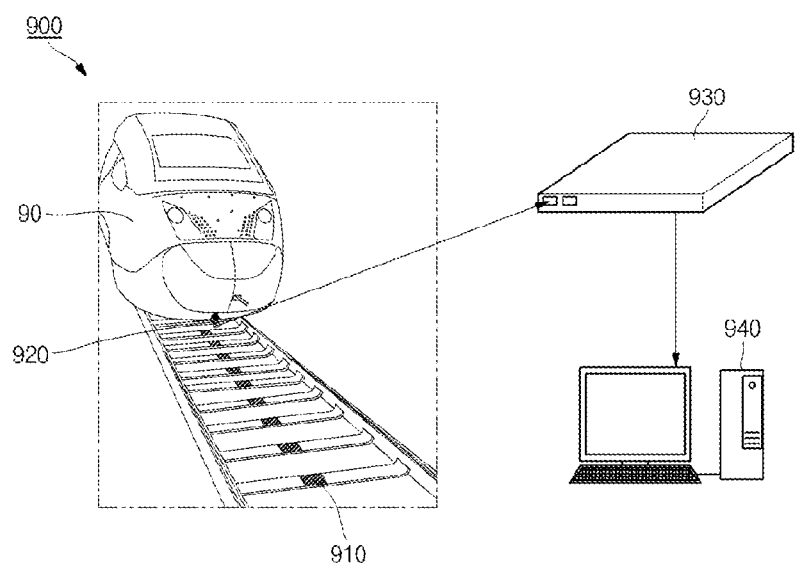
FIG. 9 is a schematic diagram illustrating a structure of an absolute position detecting system according to a third embodiment of the present invention.
Figure 10:
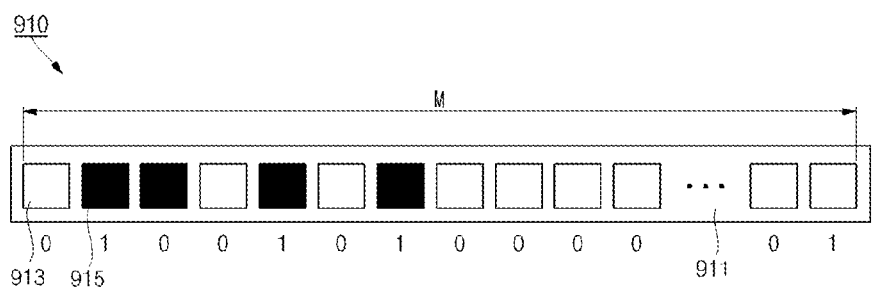
FIG. 10 illustrates a structure of a pattern part of the absolute position detecting system according to the third embodiment of the present invention.

FIG. 9 is a schematic diagram illustrating a structure of an absolute position detecting system 900 according to a third embodiment of the present invention and FIG. 10 illustrates a structure of a pattern part 910 of the absolute position detecting system according to the third embodiment of the present invention.

Referring to FIGS. 9 and 10, the absolute position detecting system 900 according to a third embodiment of the present invention includes multiple pattern parts 910, a pattern photographing part 920, a data processing part 930 and a position detecting part 940.

The multiple pattern parts 910 may be arranged on a traveling path of a vehicle 90 at a predetermined distance and at least one or more of first and second patterns 913 and 915 having different heights may be provided and arranged. The first and second patterns 913 and 915 may be arranged on a base 911 in a line.

The pattern photographing part 920 is installed in the vehicle 90, may photograph each of the multiple pattern parts 910 and may measure a brightness value for each of the first and second patterns 913 and 915. The pattern photographing part 920 may be configured to have a separate sensor mounted thereon to measure a brightness value of a pattern from a photographed image.

The data processing part 930 compares the brightness value measured by the pattern photographing part 920 with a predetermined reference brightness value, processes the comparison result into binary data and recognizes the multiple pattern parts 910.

The position detecting part 940 may detect absolute positions of the multiple pattern parts 910 using the binary data processed by the data processing part 930 and information on a distance between the multiple pattern parts 910.

The absolute position detecting system 900 according to the third embodiment of the present invention is different from the absolute position detecting systems 100 and 500 according to the first and second embodiments of the present invention in view of the followings.

In the third embodiment of the present invention, the first and second patterns 913 and 915 of the pattern part 910 have different brightness values, unlike the pattern part 110 or 510 in the first or second embodiment, so that different brightness values may be measured from a photographed image. Here, the first and second patterns 913 and 915 may be shaped of substantially rectangular plates, but not limited thereto. In addition, the first and second patterns 913 and 915 may be configured to demonstrate different brightness values by coating black and white paints thereon.

Therefore, in the third embodiment of the present invention, the respective patterns may be recognized using the brightness value, instead of the light reflectivity or the light reflection time. Configurations and operating principles of the data processing part 930 and the position detecting part 940 are similar to those of the data processing part 130, 530 and the position detecting part 140, 540 in the first, second embodiment, and detailed descriptions thereof will not be repeated.

Meanwhile, when consideration is taken into a traveling speed of the vehicle 70 (300 km/h), the pattern photographing part 920 may have an appropriate shutter speed of a 1 kHz scale. An image angle may be determined according to the length of the pattern part 910 and the resolution may be determined according to the distance between patterns.

According to the present embodiment, since the absolute position detecting system 900 operates in a non-contact manner in which data is measured by laser scanning or image photographing, a stable operation can be implemented, compared to the conventional electrical contact manner. In particular, in the laser scanning, it is not necessary to separately secure a field of vision when there is a fog.

In addition, installation and maintenance for position detection can be facilitated, and installation and maintenance costs can be reduced.

Further, since pattern parts are recognized using turned-on/off 3D patterns, pattern distortion due to dust or contaminants present on a railroad can be minimized, thereby suppressing malfunction, which may be caused by railroad circumstances.

In addition, in a case of a 3D pattern, a lower limit value of a height of the pattern can be adjusted, thereby minimizing the effect due to a rainfall or a snowfall. In particular, it is possible to further suppress effects of external circumstances, including a rainfall or a snowfall, in recognizing the pattern, by installing the pattern on an inclined surface or ground surface.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

REFERENCE NUMERALS 10, 50, 90: Vehicle
100, 500, 900: Absolute position detecting system
110, 510, 910: Pattern part
120, 520: Pattern scanning part
920: Pattern photographing part
130, 530, 930: Data processing part
140, 540, 940: Position detecting part

The invention claimed is:

1. An absolute position detecting system for a vehicle moving along a railroad, wherein the railroad comprises one or more rails and a plurality of rail ties that support the rails, comprising:
   multiple pattern parts arranged on the rail ties at a predetermined distance and including at least one or more of first and second patterns;
   a pattern scanning part installed in the vehicle and scanning each of the multiple pattern parts using laser beams and measuring light reflectivity for each of the first and second patterns;
   a data processing part comparing the measured light reflectivity with a predetermined reference light reflectivity, processing the comparison result into binary data and recognizing the multiple pattern parts; and
   a position detecting part detecting absolute positions of the multiple pattern parts using the processed binary data and information on a distance between the multiple pattern parts.

2. The absolute position detecting system of claim 1, wherein the first and second patterns have different surface roughness levels.

3. The absolute position detecting system of claim 1, wherein the patterns provided in each of the multiple pattern parts are arranged in a line within a given area.

4. The absolute position detecting system of claim 1, wherein the patterns provided in each of the multiple pattern parts are spaced apart from each other.

5. The absolute position detecting system of claim 1, wherein a total number of the patterns provided in each of the multiple pattern parts is constant.

6. The absolute position detecting system of claim 1, wherein the multiple pattern parts are installed to be parallel with the ground surface.

7. The absolute position detecting system of claim 1, wherein the multiple pattern parts are installed obliquely with respect to the ground surface.

8. The absolute position detecting system of claim 1, wherein the multiple pattern parts are installed perpendicularly to the ground surface and multiple reflectors are further provided to reflect the laser beams irradiated from the pattern scanning parts to the multiple pattern parts.

9. The absolute position detecting system of claim 1, wherein the data processing is performed on the basis of each one of the pattern parts of the data processing part, and the binary data represents the order of each of the multiple pattern parts sequentially arranged from a first position to a second position of the traveling path.

10. An absolute position detecting system for a vehicle moving along a railroad, wherein the railroad comprises one or more rails and a plurality of rail ties that support the rails, comprising:
   multiple pattern parts arranged on the rail ties at a predetermined distance and including at least one or more of first and second patterns;
   a pattern scanning part installed in the vehicle and scanning each of the multiple pattern parts using laser beams and measuring a light reflection time for each of the first and second patterns;
   a data processing part comparing the measured light reflection time with a predetermined reference light reflection time, processing the comparison result into binary data and recognizing the multiple pattern parts; and a position detecting part detecting absolute positions of the multiple pattern parts using the processed binary data and information on a distance between the multiple pattern parts.

11. The absolute position detecting system of claim 10, wherein the patterns provided in each of the multiple pattern parts are arranged in a line within a given area.

12. The absolute position detecting system of claim 10, wherein the patterns provided in each of the multiple pattern parts are spaced apart from each other.

13. The absolute position detecting system of claim 10, wherein a total number of the patterns provided in each of the multiple pattern parts is constant.

14. The absolute position detecting system of claim 10, wherein the multiple pattern parts are installed to be parallel with the ground surface.

15. The absolute position detecting system of claim 10, wherein the multiple pattern parts are installed obliquely with respect to the ground surface.

16. The absolute position detecting system of claim 10, wherein the multiple pattern parts are installed perpendicularly to the ground surface and multiple reflectors are further provided to reflect the laser beams irradiated from the pattern scanning parts to the multiple pattern parts.

17. The absolute position detecting system of claim 10, wherein the binary data represents the order of each of the multiple pattern parts sequentially arranged from a first position to a second position of the traveling path.

18. An absolute position detecting system for a vehicle moving along a railroad, wherein the railroad comprises one or more rails and a plurality of rail ties that support the rails, comprising:

multiple pattern parts arranged on the rail ties at a predetermined distance and including at least one or more of first and second patterns;

a pattern photographing part installed in the vehicle, photographing each of the multiple pattern parts and measuring a brightness value for each of the first and second patterns;

a data processing part comparing the measured brightness value with a predetermined reference brightness value, processing the comparison result into binary data and recognizing the multiple pattern parts; and a position detecting part detecting absolute positions of the multiple pattern parts using the processed binary data and information on a distance between the multiple pattern parts.

19. The absolute position detecting system of claim 18, wherein the patterns provided in each of the multiple pattern parts are arranged in a line within a given area.

20. The absolute position detecting system of claim 18, wherein the patterns provided in each of the multiple pattern parts are spaced apart from each other.

21. The absolute position detecting system of claim 18, wherein a total number of the patterns provided in each of the multiple pattern parts is constant.

22. The absolute position detecting system of claim 18, wherein the binary data represents the order of each of the multiple pattern parts sequentially arranged from a first position to a second position of the traveling path.

* * * * *